United States Patent
Asami et al.

(10) Patent No.: US 9,527,501 B2
(45) Date of Patent: Dec. 27, 2016

(54) HYBRID VEHICLE

(71) Applicant: Toyota Jidosha Kabushiki Kaisha, Toyota-shi Aichi-ken (JP)

(72) Inventors: Yoshikazu Asami, Gotenba (JP); Toshikazu Kato, Toyota (JP); Ryuta Teraya, Okazaki (JP)

(73) Assignee: Toyoda Jidosha Kabushiki Kaisha, Toyota-Shi (JP)

( * ) Notice: Subject to any disclaimer, the term of this patent is extended or adjusted under 35 U.S.C. 154(b) by 77 days.

(21) Appl. No.: 14/528,239

(22) Filed: Oct. 30, 2014

(65) Prior Publication Data

US 2015/0134171 A1 May 14, 2015

(30) Foreign Application Priority Data

Nov. 12, 2013 (JP) ................................. 2013-233888

(51) Int. Cl.
*B60W 10/06* (2006.01)
*B60W 10/08* (2006.01)
(Continued)

(52) U.S. Cl.
CPC .............. *B60W 20/10* (2013.01); *B60W 10/06* (2013.01); *B60W 10/08* (2013.01); *B60W 2510/0628* (2013.01); *B60Y 2300/437* (2013.01); *F01L 13/0063* (2013.01); *Y02T 10/6286* (2013.01); *Y10S 903/93* (2013.01)

(58) Field of Classification Search
CPC ...... B60W 20/10; B60W 10/06; B60W 10/08; B60W 2510/0628; B60Y 2300/437; Y10S 903/93; Y02T 10/6286; F01L 13/0063
See application file for complete search history.

(56) References Cited

U.S. PATENT DOCUMENTS 6,341,584 B1 1/2002 Itoyama et al.
8,961,368 B2 * 2/2015 Glugla .................. B60W 20/15
477/110

(Continued)

FOREIGN PATENT DOCUMENTS

EP 1186753 A2 3/2002
JP H09242519 A 9/1997

(Continued)

OTHER PUBLICATIONS

Office Action mailed Oct. 30, 2015 for U.S. Appl. No. 14/573,367.

*Primary Examiner* — Tuan C. To
(74) *Attorney, Agent, or Firm* — Dinsmore & Shohl LLP

(57) ABSTRACT

A control device is configured to control an engine to be started and stopped such that when a hybrid vehicle is required to output a vehicular required power smaller than an engine starting threshold value the control device operates to stop the engine and use only a motor generator to cause the vehicle to travel and when the vehicular required power exceeds the threshold value the control device operates to start the engine and use both the engine and the motor generator to cause the vehicle to travel. The engine starting threshold value is set to be higher when at least one of an amount of lifting the intake valve and a working angle on the intake valve controlled by a VVL device provided to the engine is small than when at least one of the amount and the angle is large.

8 Claims, 15 Drawing Sheets

(51) Int. Cl.
  *B60W 20/00* (2016.01)
  *F01L 13/00* (2006.01)

(56) References Cited

U.S. PATENT DOCUMENTS

| | | | |
|---|---|---|---|
| 9,238,998 B2* | 1/2016 | Doering | F02B 37/183 |
| 9,303,581 B2* | 4/2016 | Glugla | F02D 41/3094 |
| 2001/0025615 A1* | 10/2001 | Nohara | F01L 13/0026 |
| | | | 123/90.15 |
| 2003/0106515 A1 | 6/2003 | Kondo | |
| 2004/0118367 A1 | 6/2004 | Ezaki et al. | |
| 2005/0139183 A1 | 6/2005 | Nohara et al. | |
| 2005/0229880 A1 | 10/2005 | Hashizume | |
| 2006/0037568 A1 | 2/2006 | Arinaga et al. | |
| 2006/0081207 A1 | 4/2006 | Nakamura | |
| 2006/0124090 A1 | 6/2006 | Hirose et al. | |
| 2006/0272608 A1 | 12/2006 | Hara et al. | |
| 2009/0125172 A1 | 5/2009 | Matsubara | |
| 2009/0145381 A1 | 6/2009 | Watanabe | |
| 2009/0164098 A1 | 6/2009 | Uda | |
| 2009/0183706 A1 | 7/2009 | Miwa et al. | |
| 2009/0320810 A1* | 12/2009 | Kojima | F02D 21/08 |
| | | | 123/568.12 |
| 2010/0242902 A1* | 9/2010 | Kang | F02D 41/3035 |
| | | | 123/305 |
| 2010/0256891 A1* | 10/2010 | Weiss | F02D 35/023 |
| | | | 701/103 |
| 2010/0300414 A1* | 12/2010 | Pursifull | F01N 11/00 |
| | | | 123/559.1 |
| 2011/0088644 A1 | 4/2011 | Nakamura | |
| 2011/0231077 A1* | 9/2011 | Nakamura | B60K 6/48 |
| | | | 701/102 |
| 2012/0004829 A1* | 1/2012 | Bidner | F02D 41/0025 |
| | | | 701/103 |
| 2012/0132163 A1 | 5/2012 | Shoji et al. | |
| 2013/0152887 A1 | 6/2013 | Miyazato et al. | |
| 2013/0173103 A1* | 7/2013 | Ando | F02D 41/1497 |
| | | | 701/22 |
| 2014/0081564 A1* | 3/2014 | Pursifull | F02M 35/10222 |
| | | | 701/113 |
| 2014/0172275 A1* | 6/2014 | Surnilla | F02D 41/062 |
| | | | 701/104 |
| 2014/0352670 A1* | 12/2014 | Surnilla | F02M 25/07 |
| | | | 123/568.12 |
| 2015/0075492 A1* | 3/2015 | Glugla | F02D 41/3094 |
| | | | 123/349 |
| 2015/0083081 A1* | 3/2015 | Surnilla | F02M 25/0704 |
| | | | 123/406.48 |
| 2015/0120108 A1* | 4/2015 | Dudar | F02M 25/089 |
| | | | 701/22 |
| 2015/0175147 A1 | 6/2015 | Teraya et al. | |
| 2015/0175157 A1 | 6/2015 | Teraya et al. | |

FOREIGN PATENT DOCUMENTS

| | | |
|---|---|---|
| JP | 2000034913 A | 2/2000 |
| JP | 2004183610 A | 7/2004 |
| JP | 2005-113922 A | 4/2005 |
| JP | 2005299594 A | 10/2005 |
| JP | 2006342677 A | 12/2006 |
| JP | 2007-191034 A | 8/2007 |
| JP | 2008025550 A | 2/2008 |
| JP | 2009-190525 A | 8/2009 |
| JP | 2009-202662 A | 9/2009 |
| JP | 2012117376 A | 6/2012 |
| JP | 2013053610 A | 3/2013 |
| JP | 2015-116967 A | 6/2015 |
| WO | 2015049563 A1 | 4/2015 |

* cited by examiner

HYBRID VEHICLE

This nonprovisional application is based on Japanese Patent Application No. 2013-233888 filed on Nov. 12, 2013 with the Japan Patent Office, the entire contents of which are hereby incorporated by reference.

BACKGROUND OF THE INVENTION

Field of the Invention

The present invention relates to a hybrid vehicle, and more specifically to controlling a hybrid vehicle including an internal combustion engine having a variable valve actuation device for varying an actuation characteristic of an intake valve.

Description of the Background Art

A variable valve actuation device is generally known for varying an actuation characteristic of an intake valve of an internal combustion engine. Some variable valve actuation devices are configured to be capable of varying at least one of an amount of lifting an intake valve and a working angle on the intake valve. The variable valve actuation device allows an internal combustion engine to have a modified operational characteristic.

For example, Japanese Patent Laying-Open No. 2005-299594 discloses an internal combustion engine including a variable valve actuation device. More specifically, when the engine is automatically stopped, provided that the engine is restarted, the variable valve actuation device operates to allow an intake valve to be worked by a working angle increased to obtain a maximum decompression effect. Furthermore, when the engine is manually stopped and starting it at low temperature and doing so at high temperature are both expected, the variable valve actuation device operates to allow the intake valve to be worked by a working angle reduced to be smaller than when the engine is automatically stopped.

SUMMARY OF THE INVENTION

When a hybrid vehicle including an internal combustion engine having a variable valve actuation device travels at low speed, at a small load, and/or the like, the hybrid vehicle may stop the internal combustion engine and use only a traction motor's driving force to travel. When the hybrid vehicle thus travels, and requires the internal combustion engine's driving force depending on how the hybrid vehicle travels, the internal combustion engine that is currently stopped is started while the hybrid vehicle is travelling. When the internal combustion engine is started with the intake valve worked by a large working angle, a portion of air taken into a cylinder is returned out of the cylinder, which provides a decompression effect, however, a reduced amount of air is taken in, and the internal combustion engine provides a poorer torque response than when the internal combustion engine is started with the intake valve worked by a small working angle.

The impaired torque response results in reduced driving force, which may be compensated via a control by the traction motor's torque. This control requires previously increasing the internal combustion engine's driving force before a battery outputs excessive electric power as the traction motor consumes more electric power. If the internal combustion engine is timed to start invariably earlier regardless of what working angle is applied to the intake valve in starting the internal combustion engine, however, travelling with the internal combustion engine stopped and the traction motor's driving force alone used is reduced more than necessary, resulting in impaired fuel efficiency.

The present invention has been made in order to address such an issue, and it contemplates a hybrid vehicle having a variable valve actuation device for varying an actuation characteristic of an intake valve, that can reduce/prevent impaired fuel efficiency caused by starting an internal combustion engine.

The present invention in one aspect provides a hybrid vehicle comprising an internal combustion engine, a power storage device, a first rotating electric machine, and a control device. The internal combustion engine has a variable valve actuation device for varying an actuation characteristic of an intake valve. The power storage device is chargeable. The first rotating electric machine receives electric power supplied from the power storage device to generate driving force to cause the hybrid vehicle to travel. The control device is operative in response to a vehicular required power that the vehicle is required to output being smaller than a threshold value for stopping the internal combustion engine and allowing a driving force of the first rotating electric machine to be used to cause the vehicle to travel, and the control device is operative in response to the vehicular required power exceeding the threshold value for starting the internal combustion engine and allowing a driving force of the internal combustion engine and the driving force of the first rotating electric machine to be both used to cause the vehicle to travel. The variable valve actuation device is configured to be capable of selecting a first state and a second state allowing the intake valve to be lifted in a larger amount and/or worked by a larger working angle than the first state does. The control device performs a process to increase the threshold value to be higher when the first state is selected than when the second state is selected.

In the present hybrid vehicle when the intake valve is lifted in a small amount and/or worked by a small working angle the internal combustion engine is started with higher torque response than when the intake valve is lifted in a large amount and/or worked by a large working angle, and accordingly, the internal combustion engine can output a rapidly increasing torque. Accordingly, in starting the internal combustion engine, the internal combustion engine can be timed to start later by increasing a threshold value for vehicular required power at which starting the internal combustion engine is required (i.e., an engine starting threshold value) without increasing electric power output from the power storage device to increase a driving force to be compensated for by an output of the first rotating electric machine. As a result, a range allowing the vehicle to travel with the internal combustion engine stopped and the rotating electric machine's driving force alone used can be larger than when the engine starting threshold value is set invariably regardless of in what amount the intake valve is lifted and by what working angle the intake valve is worked, and the vehicle can thus reduce/prevent impaired fuel efficiency. The hybrid vehicle having the variable valve actuation device for varying the actuation characteristic (an amount of lift and/or a working angle) of the intake valve, can thus reduce/prevent impaired fuel efficiency caused by starting the internal combustion engine.

Preferably, the hybrid vehicle further comprises a second rotating electric machine coupled with an output shaft of the internal combustion engine and usable to start the internal combustion engine. In starting the internal combustion engine when the first state is selected the control device controls the second rotating electric machine, while cranking the internal combustion engine, to increase a rate that is applied to increase a rotational speed of the second rotating electric machine to be a rate higher than that applied when the second state is selected.

Increasing the rate applied to increase the second rotating electric machine's rotational speed can reduce/prevent preventing the internal combustion engine's rotational speed from increasing.

Preferably, when the variable valve actuation device is switched from the second state to the first state during a start control of the internal combustion engine, the control device controls the second rotating electric machine, while cranking the internal combustion engine, to increase the rate that is applied to increase the rotational speed of the second rotating electric machine to be a rate higher than that applied when the second state is selected.

When at least one of the amount of lifting the intake valve and the working angle on the intake valve is varied to be small in an engine start control, accordingly increasing a rate applied to increase the second rotating electric machine's rotational speed can reduce/prevent preventing the internal combustion engine's rotational speed from increasing.

Preferably, the control device performs the process when the internal combustion engine's start shock is permitted.

Accordingly, when the internal combustion engine's start shock is not permitted the above process is not performed. Reducing the internal combustion engine's start shock can thus be prioritized.

Preferably, the variable valve actuation device is configured to be capable of switching the actuation characteristic of the intake valve to any one of a first characteristic, a second characteristic allowing the intake valve to be lifted in a larger amount and/or worked by a larger working angle than when the actuation characteristic is the first characteristic, and a third characteristic allowing the intake valve to be lifted in a larger amount and/or worked by a larger working angle than when the actuation characteristic is the second characteristic.

This allows the intake valve to be lifted in an amount and worked by a working angle that are limited to three actuation characteristics, and the engine's operation state can be controlled via a control parameter adapted in a shorter period of time. Furthermore, this also allows an actuator to have a simpler configuration.

Preferably, the variable valve actuation device is configured to be capable of switching the actuation characteristic of the intake valve to any one of a first characteristic and a second characteristic allowing the intake valve to be lifted in a larger amount and/or worked by a larger working angle than when the actuation characteristic is the first characteristic.

This allows the intake valve to be lifted in an amount and worked by a working angle that are limited to two actuation characteristics, and the engine's operation state can be controlled via a control parameter adapted in a further shorter period of time. Furthermore, the actuator is allowed to have a further simpler configuration.

A major advantage of the present invention lies in a hybrid vehicle having a variable valve actuation device for varying an actuation characteristic of an intake valve, that can reduce/prevent impaired fuel efficiency caused by starting an internal combustion engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in embodiments more specifically. Note that, in the figures, identical or corresponding components are identically denoted and will not be described repeatedly.

First Embodiment

Figure 1:
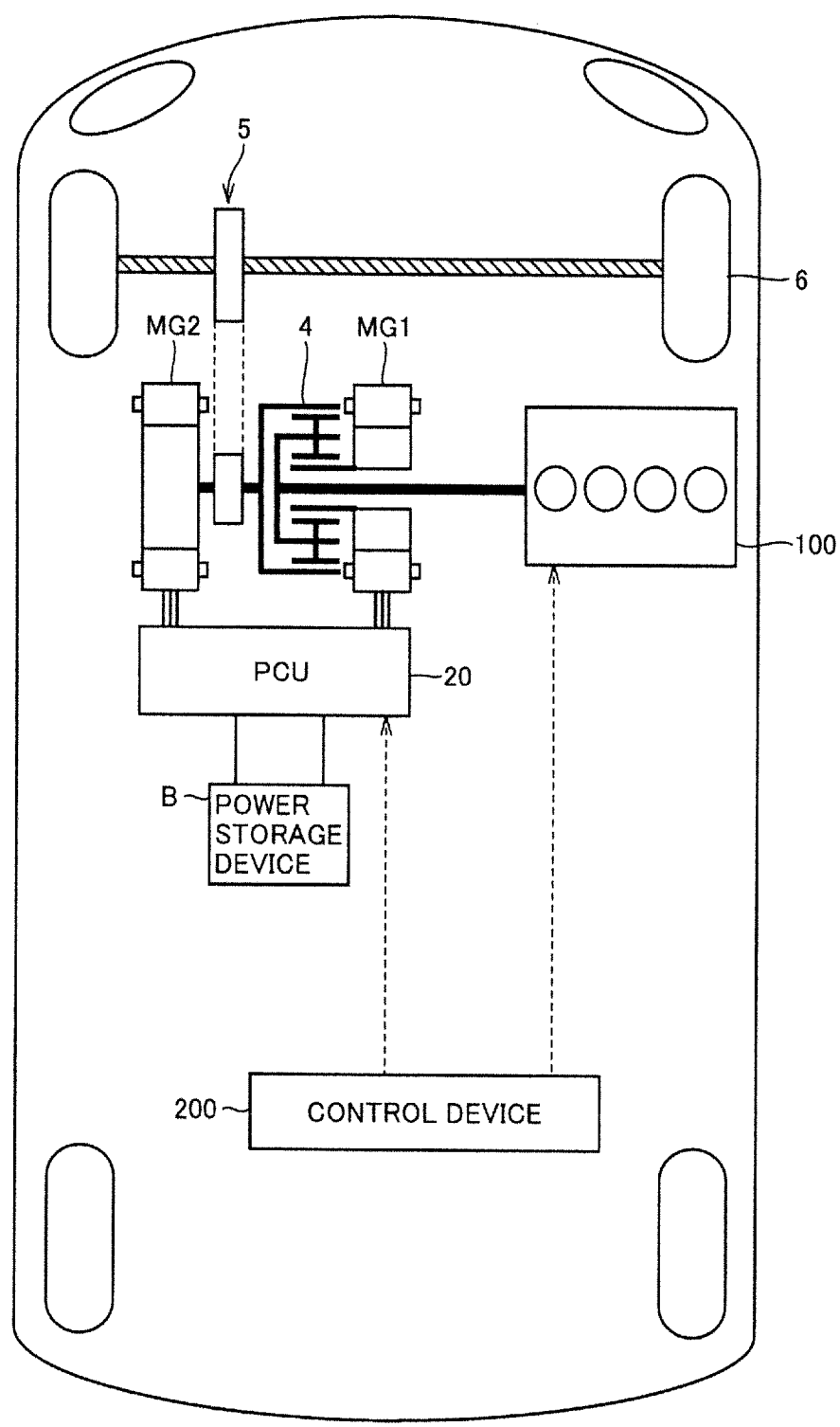
FIG. 1 is a block diagram generally showing a configuration of a hybrid vehicle having a control device applied thereto according to a first embodiment of the present invention.

FIG. 1 is a block diagram generally showing a configuration of a hybrid vehicle having a control device applied thereto according to a first embodiment of the present invention. With reference to FIG. 1, a hybrid vehicle 1 includes an engine 100, motor generators MG1 and MG2, a power split device 4, a speed reducer 5, a driving wheel 6, a power storage device B, a power control unit (PCU) 20, and a control device 200.

Hybrid vehicle 1 travels as driven by a driving force output from at least one of engine 100 and motor generator MG2. Engine 100 generates driving force which is in turn split by power split device 4 for two paths. One path transmits driving force via speed reducer 5 to driving wheel 6, and the other path transmits driving force to motor generator MG1.

Power storage device B is a chargeably and dischargeably configured electric power storage element. Power storage device B for example includes a rechargeable battery such as a lithium ion battery, a nickel metal hydride battery or a lead acid battery, or a cell of a power storage element such as an electric double layer capacitor.

Power storage device B is connected to a PCU 20 provided for driving motor generators MG1 and MG2. Power storage device B supplies PCU 20 with electric power for generating force to drive hybrid vehicle 1. Furthermore, power storage device B stores electric power generated by motor generators MG1, MG2. Power storage device B outputs 200 V for example.

PCU 20 receives direct current (DC) electric power from power storage device B and converts the received dc electric power into alternating current (AC) electric power to drive motor generators MG1 and MG2. PCU 20 also receives AC electric power generated by motor generators MG1 and MG2 and converts the received AC electric power into DC electric power to charge power storage device B therewith.

Control device 200 calculates vehicular required power based on an accelerator pedal position signal indicative of an open degree of the accelerator pedal operated, and the vehicle's travelling state, and control device 200 controls force, as based on the calculated vehicular required power, to drive engine 100 and motor generator MG2. Specifically, for a vehicular required power smaller than a threshold value, control device 200 stops engine 100 and uses the driving force of motor generator MG2 to cause the vehicle to travel as an EV, whereas for a vehicular required power exceeding the threshold value, control device 200 starts engine 100 and uses both the driving force of engine 100 and the driving force of motor generator MG2 to cause the vehicle to travel as an HV.

Figure 2:
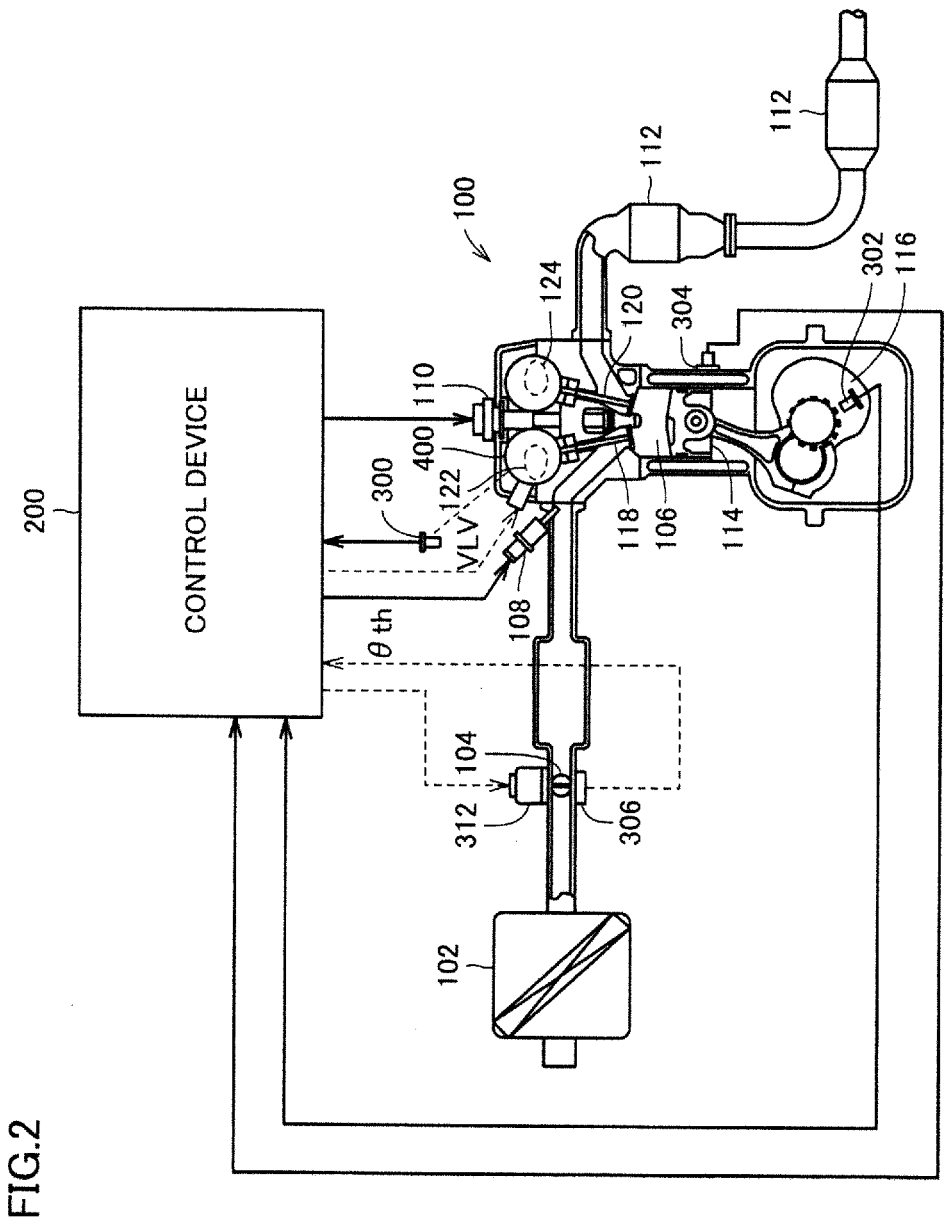
FIG. 2 shows a configuration of an engine shown in FIG. 1.

FIG. 2 shows a configuration of engine 100 shown in FIG. 1. With reference to FIG. 2, engine 100 takes in air from via an air cleaner 102. How much amount of air is taken in is adjusted by a throttle valve 104. Throttle valve 104 is an electronically controlled throttle valve driven by a throttle motor 312.

An injector 108 injects fuel towards an air intake port. At the air intake port, the fuel is mixed with air and thus introduced into a cylinder 106.

While the present embodiment will be described with engine 100 implemented in the form of a port injected engine with injector 108 having an injection port provided in the air intake port, port injecting injector 108 and in addition thereto a direct injection injector may also be provided to inject fuel directly into cylinder 106. The direct injection injector may alone be provided.

Cylinder 106 receives the air-fuel mixture, which is ignited by an ignition plug 110 and thus combusted. The combusted air-fuel mixture, or exhaust gas, is purified by a three-way catalyst 112 and subsequently discharged outside the vehicle. As the air-fuel mixture is combusted, a piston 114 is pushed down and a crankshaft 116 thus rotates.

Cylinder 106 has a head or top portion provided with an intake valve 118 and an exhaust valve 120. When and in what amount cylinder 106 receives air is controlled by intake valve 118. When and in what amount cylinder 106 exhausts exhaust gas is controlled by exhaust valve 120. Intake valve 118 is driven by a cam 122. Exhaust valve 120 is driven by a cam 124.

Intake valve 118 is lifted in an amount and worked by a working angle, as controlled by a variable valve lift (VVL) device 400, as will be described hereinafter more specifically. Exhaust valve 120 may also be similarly lifted and worked. Furthermore, a variable valve timing (VVT) device may be combined with VVL device 400 to control timing when the valve should be opened/closed.

Control device 200 controls a throttle angle θth, timing when to provide ignition, timing when to inject fuel, the amount of fuel to be injected, the intake valve's operating condition (timing when to open/close the valve, the amount of lift, the working angle, and the like) to allow engine 100 to achieve a driving state as desired. Control device 200 receives signals from a cam angle sensor 300, a crank angle sensor 302, a knock sensor 304, and a throttle angle sensor 306.

Cam angle sensor 300 outputs a signal indicating a cam's position. Crank angle sensor 302 outputs a signal indicating the rotational speed of crankshaft 116 (or the engine's rotational speed) and the angle of rotation of crankshaft 116. Knock sensor 304 outputs a signal indicating how engine 100 vibrates in intensity. Throttle angle sensor 306 outputs a signal indicating throttle angle θth.

Figure 3:
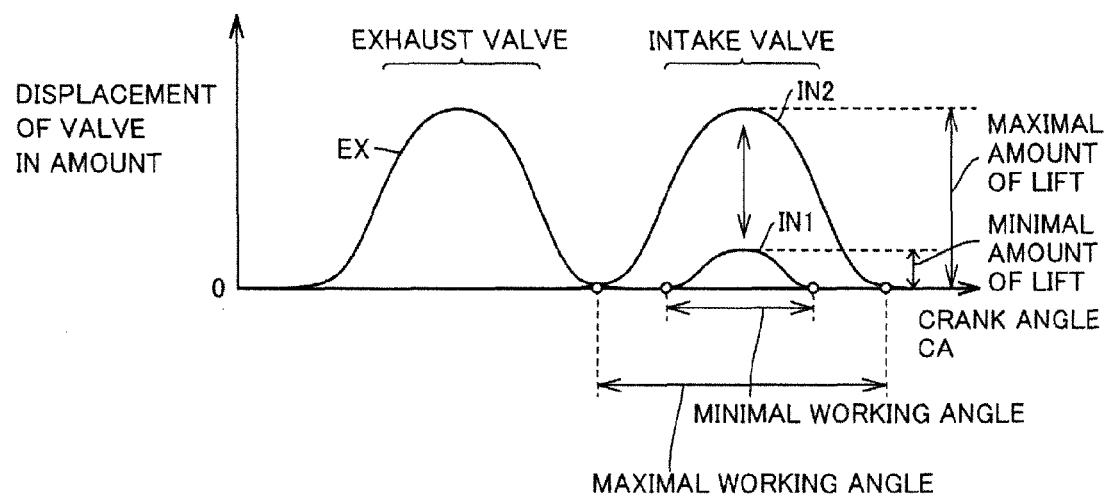
FIG. 3 represents a relationship, as implemented in a VVL device, between a valve's displacement in amount and crank angle.

FIG. 3 represents a relationship, as implemented in VVL device 400, between a valve's displacement in amount and crank angle. With reference to FIG. 3, for the exhaust stroke, exhaust valve 120 opens and closes, and for the intake stroke, intake valve 118 opens and closes. Exhaust valve 120 displaces in an amount represented by a waveform EX, and intake valve 118 displaces in amounts represented by waveforms IN1 and IN2.

The valve's displacement in amount indicates an amount by which intake valve 118 is displaced from its closed position. The amount of lift indicates an amount by which intake valve 118 is displaced when the valve peaks in how much in degree it is opened. The working angle is a crank angle assumed after intake valve 118 is opened before it is closed.

Intake valve 118 has an actuation characteristic varied by VVL device 400 between waveforms IN1 and IN2. Waveform IN1 corresponds to a minimal amount of lift and a minimal working angle. Waveform IN2 corresponds to a maximal amount of lift and a maximal working angle. In VVL device 400, a larger amount of lift is accompanied by a larger working angle.

Figure 4:
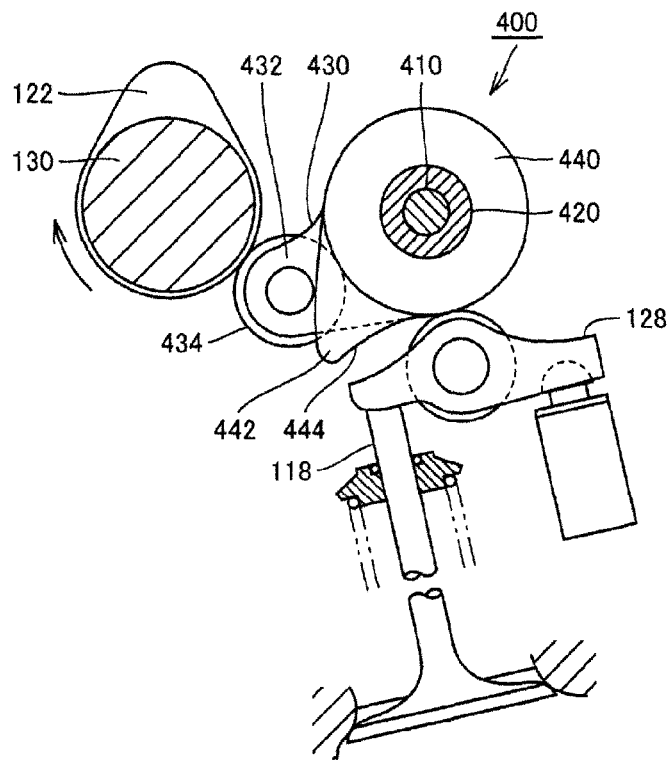
FIG. 4 is a front view of a VVL device serving as an exemplary device that controls an amount of lifting an intake valve and a working angle on the intake valve.

FIG. 4 is a front view of VVL device 400 serving as an exemplary device that controls an amount of lifting intake valve 118 and a working angle on intake valve 118. With reference to FIG. 4, VVL device 400 includes a driving shaft 410 extending in one direction, a support pipe 420 that covers driving shaft 410 circumferentially, and an input arm 430 and a rocking cam 440 disposed in alignment on an outer circumferential surface of support pipe 420 in a direction along the axis of driving shaft 410. Driving shaft 410 has a tip with an actuator (not shown) connected thereto to cause driving shaft 410 to provide rectilinear motion.

VVL device 400 is provided with a single input arm 430 associated with a single cam 122 provided for each cylinder.

Input arm 430 has opposite sides provided with two rocking cams 440 associated with a pair of intake valves 118, respectively, provided for each cylinder.

Support pipe 420 is formed in a hollowed cylinder and disposed in parallel to a cam shaft 130. Support pipe 420 is secured to a cylinder head and thus prevented from axially moving or rotating.

Support pipe 420 internally receives driving shaft 410 to allow driving shaft 410 to slide axially. Support pipe 420 has an outer circumferential surface provided thereon with input arm 430 and two rocking cams 440 to be rockable about an axial core of driving shaft 410 and also prevented from moving in a direction along the axis of driving shaft 410.

Input arm 430 has an arm portion 432 projecting in a direction away from the outer circumferential surface of support pipe 420, and a roller portion 434 rotatably connected to a tip of arm portion 432. Input arm 430 is provided to allow roller portion 434 to be disposed at a position allowing roller portion 434 to abut against cam 122.

Rocking cam 440 has a nose portion 442 in a generally triangular form projecting in a direction away from the outer circumferential surface of support pipe 420. Nose portion 442 has one side having a recessed, curved cam surface 444. Intake valve 118 is provided with a valve spring, which is biased to apply force to in turn press against cam surface 444 a roller rotatably attached to a rocker arm 128.

Input arm 430 and rocking cam 440 rock together about the axial core of driving shaft 410. Accordingly, as cam shaft 130 rotates, input arm 430 that abuts against cam 122 rocks, and as input arm 430 thus moves, rocking cam 440 also rocks. This motion of rocking cam 440 is transmitted via rocker arm 128 to intake valve 118 to thus open/close intake valve 118.

VVL device 400 further includes a device around the axial core of support pipe 420 to vary a relative phase difference between input arm 430 and rocking cam 440. The device that varies the relative phase difference allows intake valve 118 to be lifted in an amount and worked by a working angle, as modified as appropriate.

More specifically, input arm 430 and rocking cam 440 with an increased relative phase difference allow rocker arm 128 to have a rocking angle increased relative to that of input arm 430 and rocking cam 440 and intake valve 118 to be lifted in an increased amount and worked by an increased working angle.

In contrast, input arm 430 and rocking cam 440 with a reduced relative phase difference allow rocker arm 128 to have a rocking angle reduced relative to that of input arm 430 and rocking cam 440 and intake valve 118 to be lifted in a reduced amount and worked by a reduced working angle.

Figure 5:
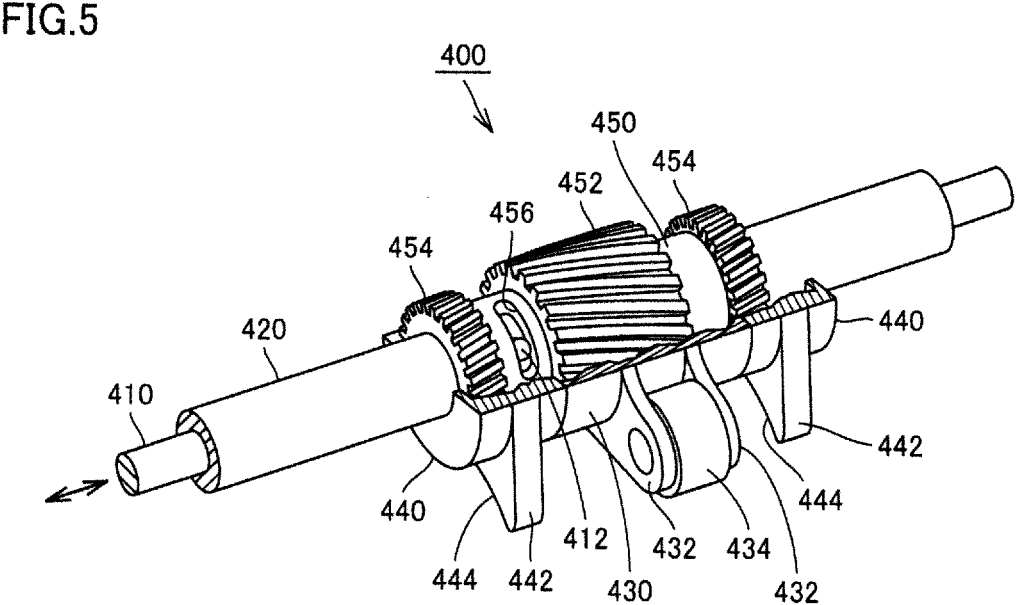
FIG. 5 is a partial perspective view of the VVL device.

FIG. 5 is a partial perspective view of VVL device 400. FIG. 5 shows VVL device 400 partially exploded to help to clearly understand its internal structure.

With reference to FIG. 5, input arm 430 and two rocking cams 440, and an outer circumferential surface of support pipe 420 define a space therebetween, and in that space, a slider gear 450 is accommodated that is supported to be rotatable relative to support pipe 420 and also axially slideable. Slider gear 450 is provided slideably on support pipe 420 axially.

Slider gear 450 as seen axially has a center provided with a helically right handed splined helical gear 452. Slider gear 450 as seen axially also has opposite sides provided with helically left handed splined helical gears 454s, respectively, with helical gear 452 posed therebetween.

An internal circumferential surface of input arm 430 and two rocking cams 440 that defines the space that has slider gear 450 accommodated therein, is helically splined to correspond to helical gears 452 and 454. More specifically, input arm 430 is helically right handed splined to mesh with helical gear 452. Furthermore, rocking cam 440 is helically left handed splined to mesh with helical gear 454.

Slider gear 450 is provided with an elongate hole 456 located between one helical gear 454 and helical gear 452 and extending circumferentially. Furthermore, although not shown, support pipe 420 is provided with an elongate hole extending axially and overlapping a portion of elongate hole 456. Driving shaft 410, inserted in support pipe 420, is integrally provided with a locking pin 412 to project through those portions of elongate hole 456 and the unshown elongate hole which overlap each other.

Driving shaft 410 is coupled with an actuator (not shown), and when the actuator is operated, driving shaft 410 moves in its axial direction, and accordingly, slider gear 450 is pushed by locking pin 412 and helical gears 452 and 454 move in a direction along the axis of driving shaft 410 concurrently. While helical gears 452 and 454 are thus moved, input arm 430 and rocking cam 440 splined and thus engaged therewith do not move in the axial direction. Accordingly, input arm 430 and rocking cam 440, helically splined and thus meshed, pivot about the axial core of driving shaft 410.

Note that input arm 430 and rocking cam 440 are helically splined in opposite directions, respectively. Accordingly, input arm 430 and rocking cam 440 pivot in opposite directions, respectively. This allows input arm 430 and rocking cam 440 to have a relative phase difference varied to allow intake valve 118 to be lifted in a varying amount and worked by a varying working angle, as has been previously described. Note that the VVL device is not limited to such a form as described above. For example, the VVL device may be a VVL device which electrically drives the valve, a VVL device which hydraulically drives the valve, or the like.

Control device 200 controls by how much amount the actuator that causes driving shaft 410 to move in rectilinear motion should be operated to control the amount of lifting intake valve 118 and the working angle on intake valve 118.

Figure 6:
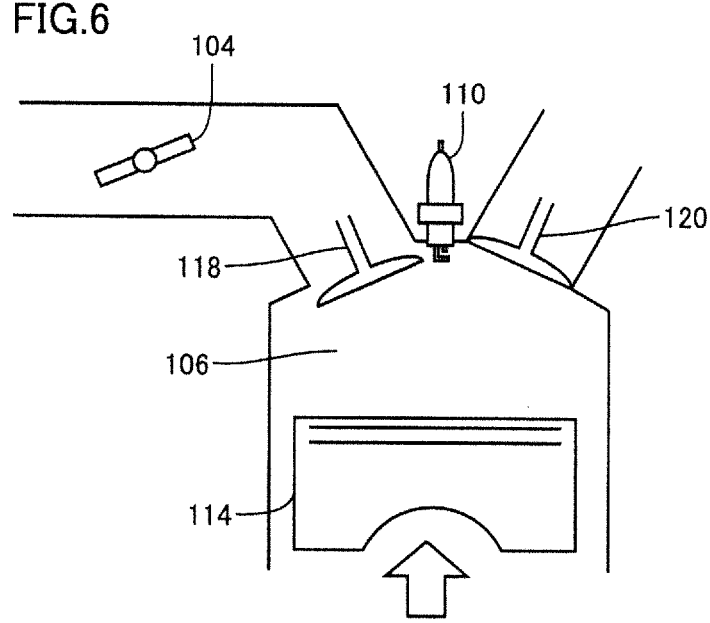
FIG. 6 illustrates an operation provided when the intake valve is lifted in a large amount and worked by a large working angle.
Figure 7:
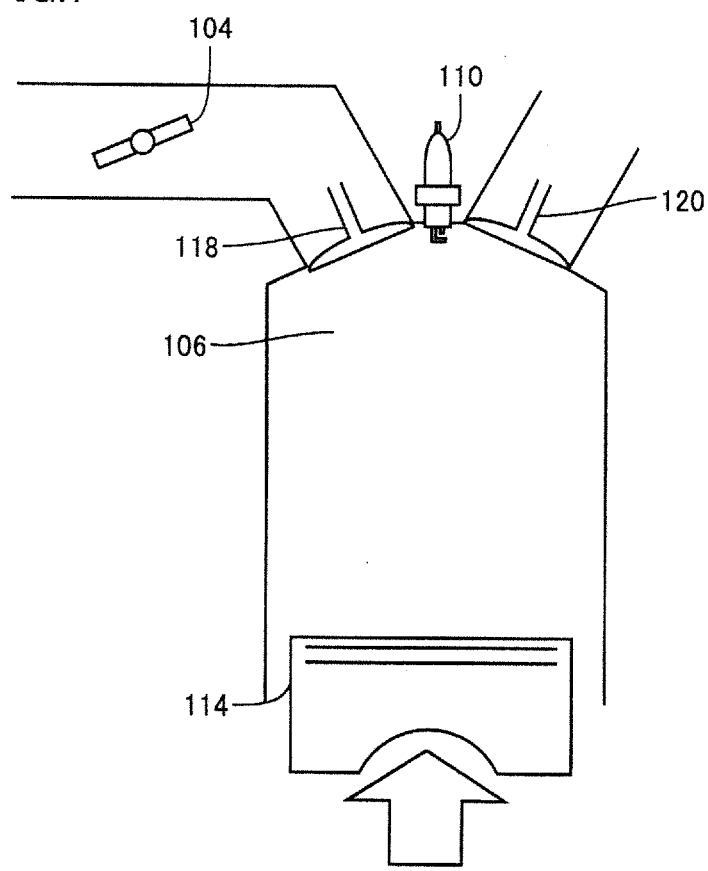
FIG. 7 illustrates an operation provided when the intake valve is lifted in a small amount and worked by a small working angle.

FIG. 6 illustrates an operation provided when intake valve 118 is lifted in a large amount and worked by a large working angle. FIG. 7 illustrates an operation provided when intake valve 118 is lifted in a small amount and worked by a small working angle. With reference to FIGS. 6 and 7, when intake valve 118 is lifted in a large amount and worked by a large working angle, intake valve 118 is timed to close late, and accordingly, engine 100 is operated in the Atkinson cycle. More specifically, the intake stroke is performed to allow cylinder 106 to take in air, which is partially returned outside cylinder 106, and accordingly, the compression stroke is performed with the air compressed by a reduced force, i.e., with a reduced compressive reaction. This allows the engine to be started with reduced vibration. However, a reduced compression ratio is provided resulting in poor ignitability.

In contrast, when intake valve 118 is lifted in a small amount and worked by a small working angle, intake valve 118 is timed to close early, and accordingly, a raised compression ratio is provided. This can improve ignitability for low temperature. However, an increased compressive reaction is provided resulting in the engine vibrating more when it starts. Furthermore, when intake valve 118 is lifted in a small amount and worked by a small working angle, improved engine torque response is provided, as will be described hereinafter.

Figure 8:
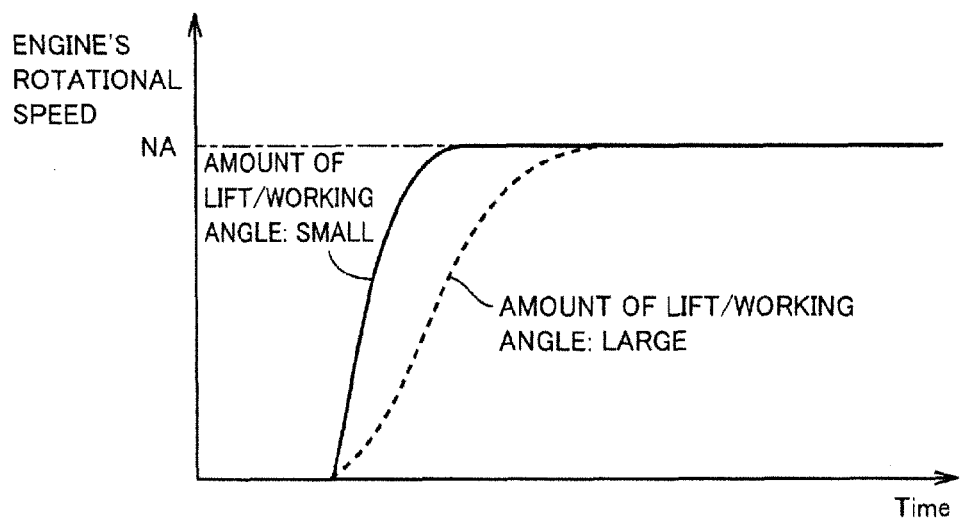
FIG. 8 is a timing plot for illustrating a difference in engine torque response depending on a characteristic of the intake valve.
Figure 9:
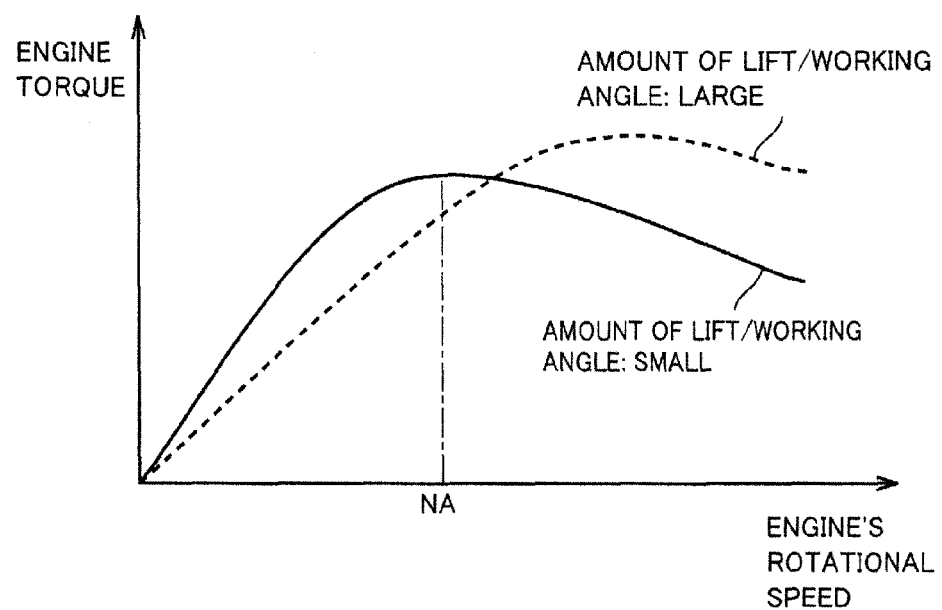
FIG. 9 is a graph for illustrating a difference in engine torque depending on a characteristic of the intake valve.

FIG. 8 is a timing plot for illustrating a difference in engine torque response depending on a characteristic of intake valve 118. In FIG. 8, the axis of abscissa represents time and the axis of ordinate represents the engine's rotational speed. FIG. 9 is a graph for illustrating a difference in engine torque depending on a characteristic of intake valve 118. In FIG. 9, the axis of abscissa represents the engine's rotational speed and the axis of ordinate represents engine torque. In FIGS. 8 and 9, a solid line corresponds to a small amount of lift and a small working angle, and a broken line corresponds to a large amount of lift and a large working angle.

With reference to FIG. 8 and FIG. 9, when the engine's rotational speed is in a lower range, a smaller amount of lift and a smaller working angle allow a larger engine torque to be output than a larger amount of lift and a larger working angle do. The larger amount of lift and the larger working angle allow a portion of air taken in the cylinder to be returned out of the cylinder. In contrast, the smaller amount of lift and the smaller working angle allow intake valve 118 to be closed earlier, and accordingly, a larger amount of air to be introduced, and engine 100 can thus output an increased torque.

In contrast, when the engine's rotational speed is in a higher range, a larger amount of lift and a larger working angle allow a larger engine torque to be output than a smaller amount of lift and a smaller working angle do. This is because the larger amount of lift and the larger working angle allow air's inertia force to be exploited to introduce a larger amount of air.

Accordingly, when engine 100's rotational speed is raised to a rotational speed targeted in starting the engine, i.e., to a prescribed value NA, a smaller amount of lift and a smaller working angle, allowing a larger engine torque to be output for a low rotation range, allow the engine's rotational speed to be rapidly increased. In contrast, a larger amount of lift and a larger working angle allow only a small engine torque to be output for the low rotation range, resulting in impaired engine torque response.

Accordingly, when engine 100 is to be started, intake valve 118 may be lifted in an increased amount to start engine 100 with reduced engine start shock. This allows a decompression effect to be exploited to reduce vibration caused in starting the engine, and the vehicle can thus be comfortable to ride in.

Lifting intake valve 118 in an increased amount to start engine 100, however, results in reduced engine torque response, and this entails using motor generator MG2's torque to compensate for a driving force until engine 100 has been completely started. This requires previously enhancing engine 100's driving force before power storage device B outputs excessive electric power as motor generator MG2 consumes large electric power. However, timing engine 100 to start invariably earlier regardless of what working angle is applied to intake valve 118 in starting engine 100 reduces travelling as an EV more than necessary, resulting in impaired fuel efficiency.

In the present embodiment, in starting engine 100 when intake valve 118 is lifted in a small amount and/or worked by a small working angle, a process is performed to increase a vehicular required power for starting engine 100 to be larger than when intake valve 118 is lifted in a large amount and/or worked by a large working angle. Hereinafter, this will be described more specifically.

Figure 10:
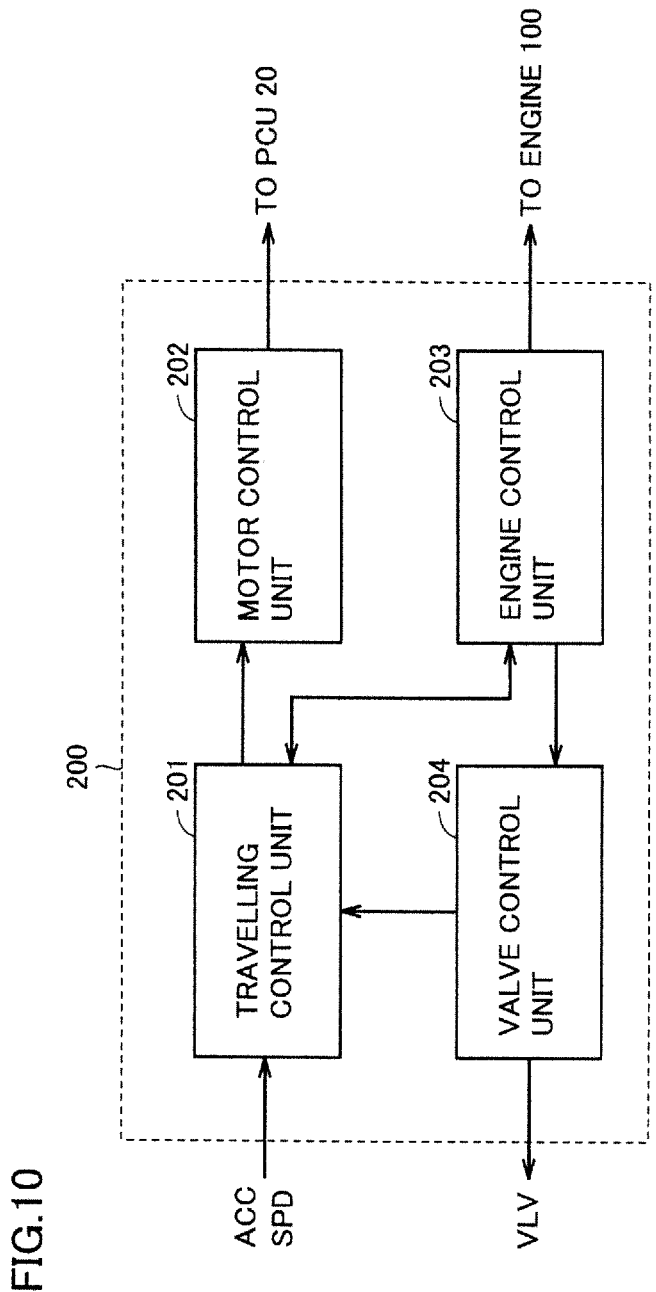
FIG. 10 is a functional block diagram for illustrating a start control that the FIG. 1 control device performs.

FIG. 10 is a functional block diagram for illustrating a start control that the FIG. 1 control device 200 performs. Each functional block shown in FIG. 10 is implemented by processing done by control device 200 via hardware or software.

With reference to FIG. 10, control device 200 includes a travelling control unit 201, a motor control unit 202, an engine control unit 203, and a valve control unit 204.

Travelling control unit 200 calculates vehicular required power based on an accelerator pedal position signal, the vehicle's travelling state and/or the like, and controls the operation states of engine 100 and motor generators MG1 and MG2, as based on the calculated vehicular required power. Specifically, when the engine is stopped, and the vehicular required power as calculated exceeds an engine starting threshold value, travelling control unit 201 generates a signal for starting engine 100 and outputs the signal to engine control unit 203.

Herein, travelling control unit 201 sets the engine starting threshold value in response to a signal received from valve control unit 204 and indicating an amount of lifting intake valve 118 and a working angle on intake valve 118. Specifically, if engine 100's start shock is not permitted or intake valve 118 is lifted in a large amount and worked by a large working angle, travelling control unit 201 sets the engine starting threshold value to a prescribed value X. In contrast, if engine 100's start shock is permitted and intake valve 118 is lifted in a small amount and worked by a small working angle, travelling control unit 201 sets the engine starting threshold value to a prescribed value Y.

Note that prescribed values X and Y are values used to determine whether it is necessary to start engine 100 to satisfy vehicular required power and that prescribed value Y is a value larger than prescribed value X. Thus when engine 100's start shock is permitted and intake valve 118 is lifted in a small amount and worked by a small working angle, engine 100 is timed to start later and travelling as an EV is thus more easily continued than when engine 100's start shock is not permitted or intake valve 118 is lifted in a large amount and worked by a large working angle.

Note that engine 100's start shock is permitted in restarting engine 100 when: hybrid vehicle 1 is traveling at high vehicular speed; when VVL device 400 has failed (e.g., when it is inoperable with intake valve 118 lifted in a small amount and/or worked by a small working angle); when fuel efficiency is prioritized (e.g., when an eco-mode is selected to prioritize fuel efficiency); when acceleration is prioritized (e.g., when the accelerator pedal is operated in a maximum amount); and/or the like. In such cases, it is more important to operate engine 100 in a desired operational state than to reduce engine 100's start shock. Accordingly, engine 100's start shock is permitted to allow priority to be given to operating engine 100 in the desired operational state.

Furthermore, travelling control unit 201 calculates the engine's required power based on vehicular required power and outputs the engine's required power as calculated to engine control unit 203.

Engine control unit 203 receives the engine's required power from travelling control unit 201 and accordingly sets a target value for an operating point of engine 100. The operating point of engine 100 is determined by the engine's rotational speed and torque. Engine control unit 203 outputs to travelling control unit 201 and valve control unit 204 a signal indicating the target value for the operating point of engine 100.

Valve control unit 204 receives the target value from engine control unit 203 and accordingly regulates an amount of lifting intake valve 118 and a working angle on intake valve 118. Valve control unit 204 generates a signal VLV for controlling VVL device 400 and outputs the generated signal to VVL device 400. Valve control unit 204 outputs to travelling control unit 201 a signal indicating an amount of lifting intake valve 118 and a working angle on intake valve 118.

When starting engine 100, travelling control unit 201 calculates a target value for a rotational speed of motor generator MG1 to crank engine 100. Once engine 100 is cranked, travelling control unit 201 calculates a target value for a rotational speed of motor generator MG1 to allow engine 100 to have an operating point maintained at a desired operating point. Travelling control unit 201 outputs the target value for the rotational speed of motor generator MG1, as calculated, to motor control unit 202.

Motor control unit 202 generates an instruction for controlling PCU 20 to allow motor generator MG1 to have a rotational speed indicated by the target value received from travelling control unit 201, and motor control unit 202 outputs the generated instruction to PCU 20.

Figure 11:
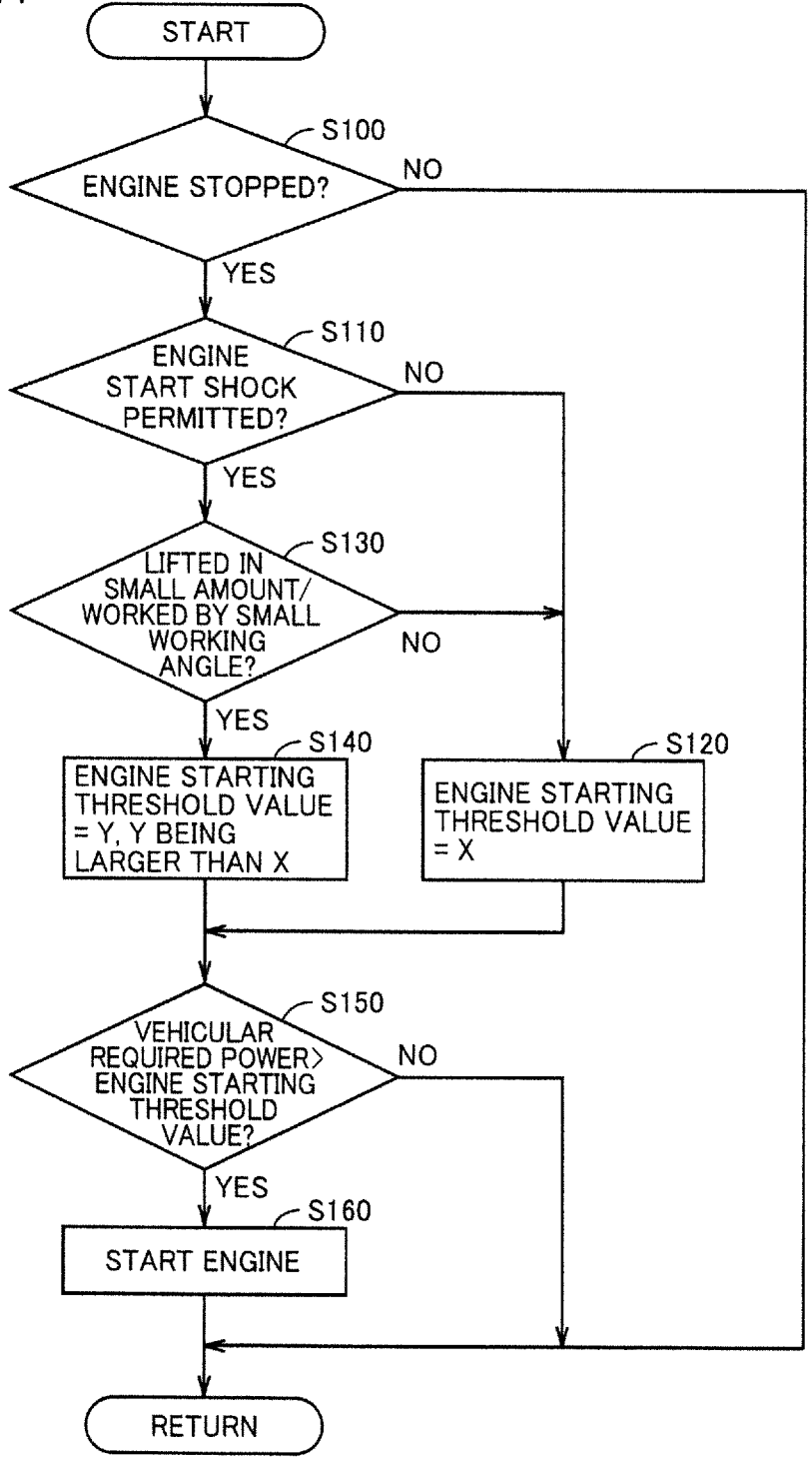
FIG. 11 is a flowchart for illustrating a process that the FIG. 1 control device follows to perform the start control.

FIG. 11 is a flowchart for illustrating a process that the FIG. 1 control device 200 follows to perform the start control. The FIG. 11 flowchart is implemented by periodically executing a program previously stored in control device 200.

Alternatively, some steps may be performed via constructed dedicated hardware (or electronic circuitry). This also applies to the flowcharts shown in FIG. 17 and FIG. 18 described hereinafter.

With reference to FIG. 11, control device 200 in Step (S) 100 determines whether engine 100 is currently stopped. If it is determined that engine 100 is currently not stopped (NO in S100), the subsequent steps are not performed and the control returns to the main routine. If it is determined that engine 100 is currently stopped (YES in S100), control device 200 determines whether engine start shock is permitted (S110).

If it is determined that the engine start shock is not permitted (NO in S110), control device 200 sets the engine starting threshold value to prescribed value X (S120). If it is determined that the engine start shock is permitted (YES in S110), control device 200 determines whether intake valve 118 is lifted in a small amount and worked by a small working angle (S130).

If it is determined that intake valve 118 is lifted in a large amount and worked by a large working angle (NO in S130), control device 200 sets the engine starting threshold value to prescribed value X (S120). If it is determined that intake valve 118 is lifted in a small amount and worked by a small working angle (YES in S130), control device 200 sets the engine starting threshold value to prescribed value Y larger than prescribed value X (S140).

Subsequently, in S150, control device 200 determines whether vehicular required power is larger than the engine starting threshold value. If it is determined that the vehicular required power is equal to or smaller than the engine starting threshold value (NO in S150), the subsequent steps are not performed and the control returns to the main routine. If it is determined that the vehicular required power is larger than the engine starting threshold value (YES in S150), control device 200 generates a signal for starting engine 100 and outputs the generated signal to PCU 20 and engine 100 (S160).

Figure 12:
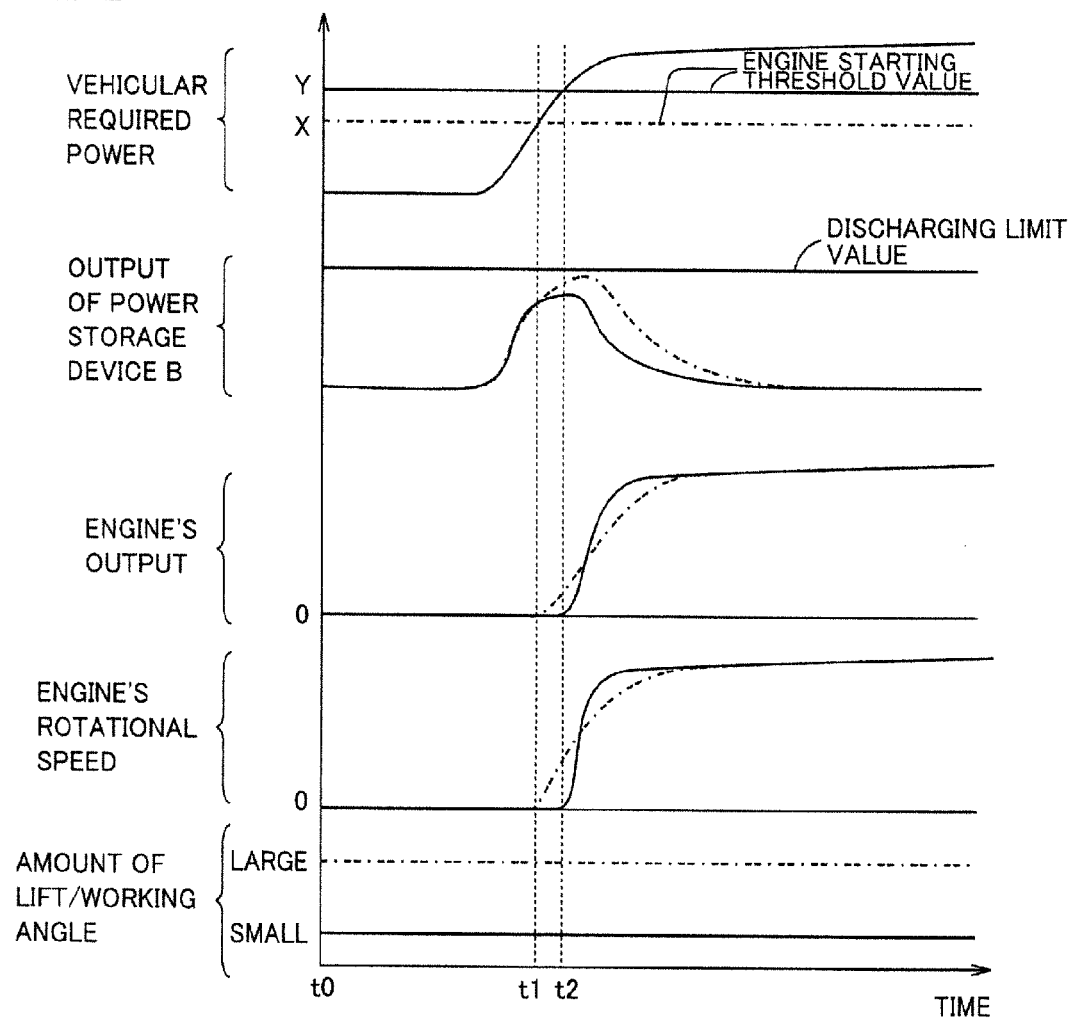
FIG. 12 is timing plots for illustrating how the FIG. 1 control device performs the start control.

FIG. 12 is timing plots for illustrating how the FIG. 1 control device 200 performs the start control. In FIG. 12, the axis of abscissa represents time and the axis of ordinate represents vehicular required power, the output of power storage device B, the engine's output, the engine's rotational speed, and the amount of lifting intake valve 118 and the working angle on intake valve 118. Note that a solid line corresponds to a small amount of lift and a small working angle and an alternate long and short dashed line corresponds to a large amount of lift and a large working angle.

With reference to FIG. 12, engine 100 is stopped at time t0 for the sake of illustration. For the large amount of lift and the large working angle, the vehicular required power exceeds the engine starting threshold value (of prescribed value X) at time t1, and accordingly, starting engine 100 starts. The large amount of lift and the large working angle are accompanied by low engine torque response, and this entails using motor generator MG2's output to compensate for a shortage of the engine's output relative to the vehicular required power. As a result, the torque of motor generator MG2 required is increased. This entails previously enhancing the engine's output before power storage device B provides an output exceeding a discharging limit value as motor generator MG2's torque is increased. Accordingly, an engine starting threshold value is set to time engine 100 to start earlier.

For the small amount of lift and the small working angle, in contrast, the vehicular required power exceeds the engine starting threshold value (of prescribed value Y) at time t2, and accordingly, starting engine 100 starts. The small amount of lift and the small working angle are accompanied by high engine torque response, and the torque of motor generator MG2 required is reduced. This provides a margin to an output of power storage device B relative to the discharging limit value, and accordingly, an engine starting threshold value is set to time engine 100 to start later.

Thus for the small amount of lift and the small working angle a larger engine starting threshold value is set than for the large amount of lift and the large working angle, and a range allowing the vehicle to travel as an EV can thus be increased. Impaired fuel efficiency can thus be reduced/prevented.

Thus, in the first embodiment, in starting engine 100 when intake valve 118 is lifted in a small amount and/or worked by a small working angle control unit 200 performs a process to increase a vehicular required power for starting engine 100 to be larger than when intake valve 118 is lifted in a large amount and/or worked by a large working angle.

When intake valve 118 is lifted in a small amount and/or worked by a small working angle engine 100 is started with higher torque response than when intake valve 118 is lifted in a large amount and/or worked by a large working angle. Accordingly, engine 100 can output a rapidly increasing torque to contribute to reducing an output of motor generator MG2. This allows engine 100 to be started with motor generator MG2 consuming reduced electric power, which can provide a margin to electric power output by power storage device B and thus allows engine 100 to be timed to start later. As a result, travelling as an EV can be increased and impaired fuel efficiency can be reduced/prevented. Hybrid vehicle 1 having VVL device 400 for varying an actuation characteristic (i.e., an amount of lift and/or a working angle) of intake valve 118, can thus reduce/prevent impaired fuel efficiency caused by starting engine 100.

Furthermore, engine 100 started with high torque response can achieve a rapidly increasing rotational speed and accordingly have its operating point rapidly shifted to that allowing good fuel efficiency. This can prevent engine 100 from being operated at an operating point providing impaired fuel efficiency and thus allows hybrid vehicle 1 to achieve better fuel efficiency. Furthermore, as engine 100 can have a rotational speed increasing at an increased rate, engine 100 can provide a rapidly increasing power to contribute to enhanced acceleratability. Furthermore, when intake valve 118 is lifted in a large amount and/or worked by a large working angle, engine 100 is timed to start relatively early, and power storage device B can thus be prevented from outputting excessive electric power.

Furthermore, in the first embodiment, control device 200 performs the above process when engine 100's start shock is permitted. This allows priority to be given to reducing/preventing impaired fuel efficiency, rather than reducing engine 100's start shock. In contrast, when engine 100's start shock is not permitted the above process is not performed. This allows priority to be given to reducing engine 100's start shock.

Note that intake valve 118 may be lifted in an amount and worked by a working angle which vary steplessly or discretely (or in steps).

Figure 13:
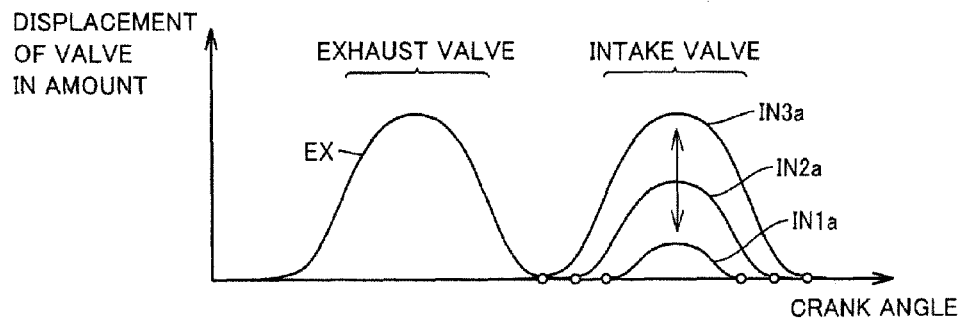
FIG. 13 represents a relationship between the intake valve's displacement in amount and crank angle, as implemented by a VVL device that can vary the intake valve's actuation characteristic in three levels.

FIG. 13 represents a relationship between the valve's displacement in amount and crank angle, as implemented by a VVL device 400A that can vary intake valve 118's actuation characteristic in three levels. VVL device 400A is configured to be capable of varying the actuation characteristic to be any one of first to third characteristics. The first characteristic is represented by a waveform IN1$a$. The second characteristic is represented by a waveform IN2$a$ and corresponds to a larger amount of lift and a larger working angle than the first characteristic. The third characteristic is represented by a waveform IN3$a$ and corresponds to a larger amount of lift and a larger working angle than the second characteristic.

Figure 14:
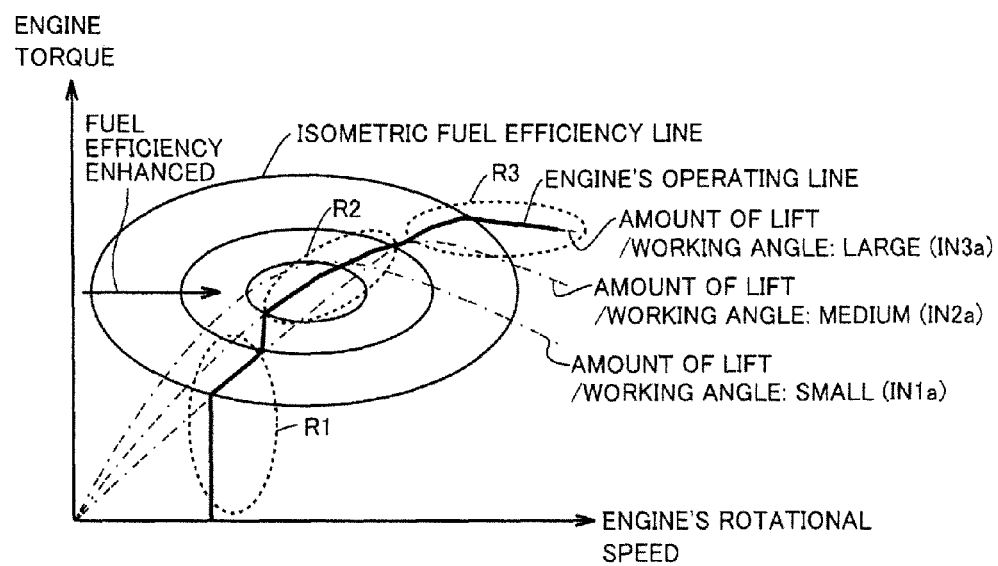
FIG. 14 shows an operating line of an engine including a VVL device having the actuation characteristic shown in FIG. 13.

FIG. 14 represents an operating line of an engine 100A including VVL device 400A having the FIG. 13 actuation characteristic. In FIG. 14, the axis of abscissa represents the engine's rotational speed and the axis of ordinate represents engine torque. Note that in FIG. 14, alternate long and short dashed lines indicate torque characteristics corresponding to the first to third characteristics (IN1$a$-IN3$a$). Furthermore, in FIG. 14, a circle indicated by a solid line indicates an isometric fuel efficiency line. The isometric fuel efficiency line indicates connected points equal in fuel consumption, and a point closer to the center of the circle corresponds to more enhanced fuel efficiency. Engine 100A is basically operated on an engine operating line indicated in FIG. 14 by a solid line, for the sake of illustration.

Herein, a range R1 indicates a low rotational speed range, for which reducing a shock caused when the engine starts is important. Furthermore, exhaust gas recirculation (EGR) is ceased and the Atkinson cycle is applied for enhanced fuel efficiency. To do so, the third characteristic (IN3$a$) is selected as the actuation characteristic of intake valve 118 to provide an increased amount of lift and an increased working angle. A range R2 indicates a medium rotational speed range, for which the EGR is applied to introduce exhaust gas in an increased amount for enhanced fuel efficiency. To do so, the second characteristic (IN2$a$) is selected as the actuation characteristic of intake valve 118 to provide an intermediate amount of lift and an intermediate working angle.

In other words, when intake valve 118 is lifted in a large amount and worked by a large working angle (i.e., the third characteristic is selected), enhancing fuel efficiency via the Atkinson cycle, rather than via the EGR, is prioritized. In contrast, when a medium amount of lift and a medium working angle are selected (i.e., the second characteristic is selected), enhancing fuel efficiency via the EGR, rather than via the Atkinson cycle, is prioritized.

A range R3 indicates a high rotational speed range, for which intake inertia is exploited to introduce a large amount of air into the cylinder to provide an increased actual compression ratio for better output performance. To do so, the third characteristic (IN3$a$) is selected as the actuation characteristic of intake valve 118 to provide an increased amount of lift and an increased working angle.

When engine 100A is operated in the low rotational speed range at a large load; engine 100A is started at cryogenic temperature; or a catalyst is warmed up, the first characteristic (IN1$a$) is selected as the actuation characteristic of intake valve 118 to provide a reduced amount of lift and a reduced working angle. Thus an amount of lift and a working angle are determined depending on how engine 100A is operated.

Figure 15:
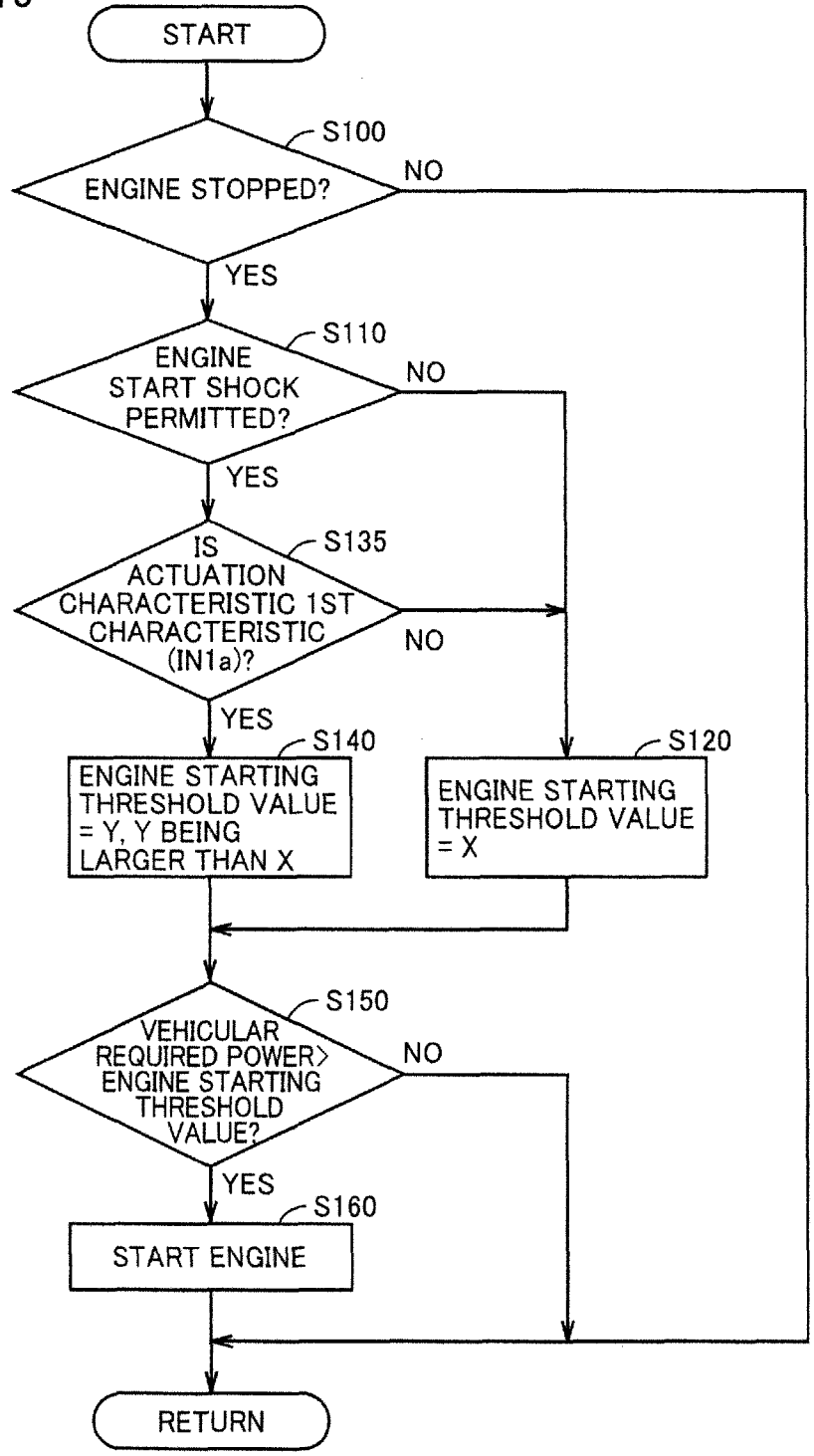
FIG. 15 is a flowchart for illustrating a process that a control device that controls a VVL device having the FIG. 13 actuation characteristic follows to perform a start control.

FIG. 15 is a flowchart for illustrating a process that control device 200A that controls VVL device 400A having the FIG. 13 actuation characteristic follows to perform a start control. With reference to FIG. 15, S100-S120 and S140-S160 are similar to the FIG. 11 flowchart, and accordingly, will not be described repeatedly.

In S110 if it is determined that the engine start shock is permitted (YES in S110), control device 200A determines whether intake valve 118's actuation characteristic is the first characteristic (S135).

If it is determined that intake valve 118's actuation characteristic is not the first characteristic (NO in S135), control device 200A sets the engine starting threshold value to prescribed value X (S120). If it is determined that intake valve 118's actuation characteristic is the first characteristic (YES in S135), control device 200A sets the engine starting threshold value to prescribed value Y larger than prescribed value X (S140).

This allows intake valve 118 to be lifted in an amount and worked by a working angle that are limited to three actuation characteristics, and engine 100A's operation state can be controlled via a control parameter adapted in a period of time shorter than required when intake valve 118 is lifted in a steplessly varying amount and worked by a steplessly varying working angle. Furthermore, a torque that an actuator requires to vary the amount of lifting intake valve 118 and the working angle on intake valve 118 can be reduced and the actuator can thus be reduced in size and weight. The actuator can thus be produced at a reduced cost.

Figure 16:
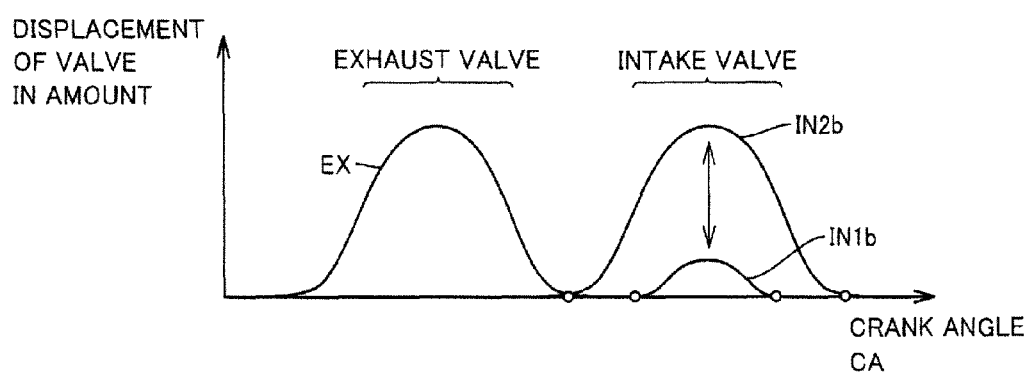
FIG. 16 represents a relationship between the intake valve's displacement in amount and crank angle, as implemented by a VVL device that can vary the intake valve's actuation characteristic in two levels.

FIG. 16 represents a relationship between the valve's displacement in amount and crank angle, as implemented by a VVL device 400B that can vary intake valve 118's actuation characteristic in two levels. VVL device 400B is configured to be capable of varying the actuation characteristic to be any one of first and second characteristics. The first characteristic is represented by a waveform IN1$b$. The second characteristic is represented by a waveform IN2$b$ and corresponds to a larger amount of lift and a larger working angle than the first characteristic.

This allows intake valve 118 to be lifted in an amount and worked by a working angle that are limited to two actuation characteristics, and engine 100's operation state can be controlled via a control parameter adapted in a further shorter period of time. Furthermore, the actuator is allowed to have a simpler configuration. Note that intake valve 118 may not be lifted in an amount or worked by a working angle that are limited to an actuation characteristic varying between two or three levels, and intake valve 118 may be lifted in an amount or worked by a working angle with an actuation characteristic varying between four or more levels.

Second Embodiment

In the present embodiment, in starting engine 100 when intake valve 118 is lifted in a small amount and/or worked by a small working angle a rate applied to increase motor generator MG1's rotational speed is increased to be a rate higher than when intake valve 118 is lifted in a large amount and/or worked by a large working angle.

Figure 17:
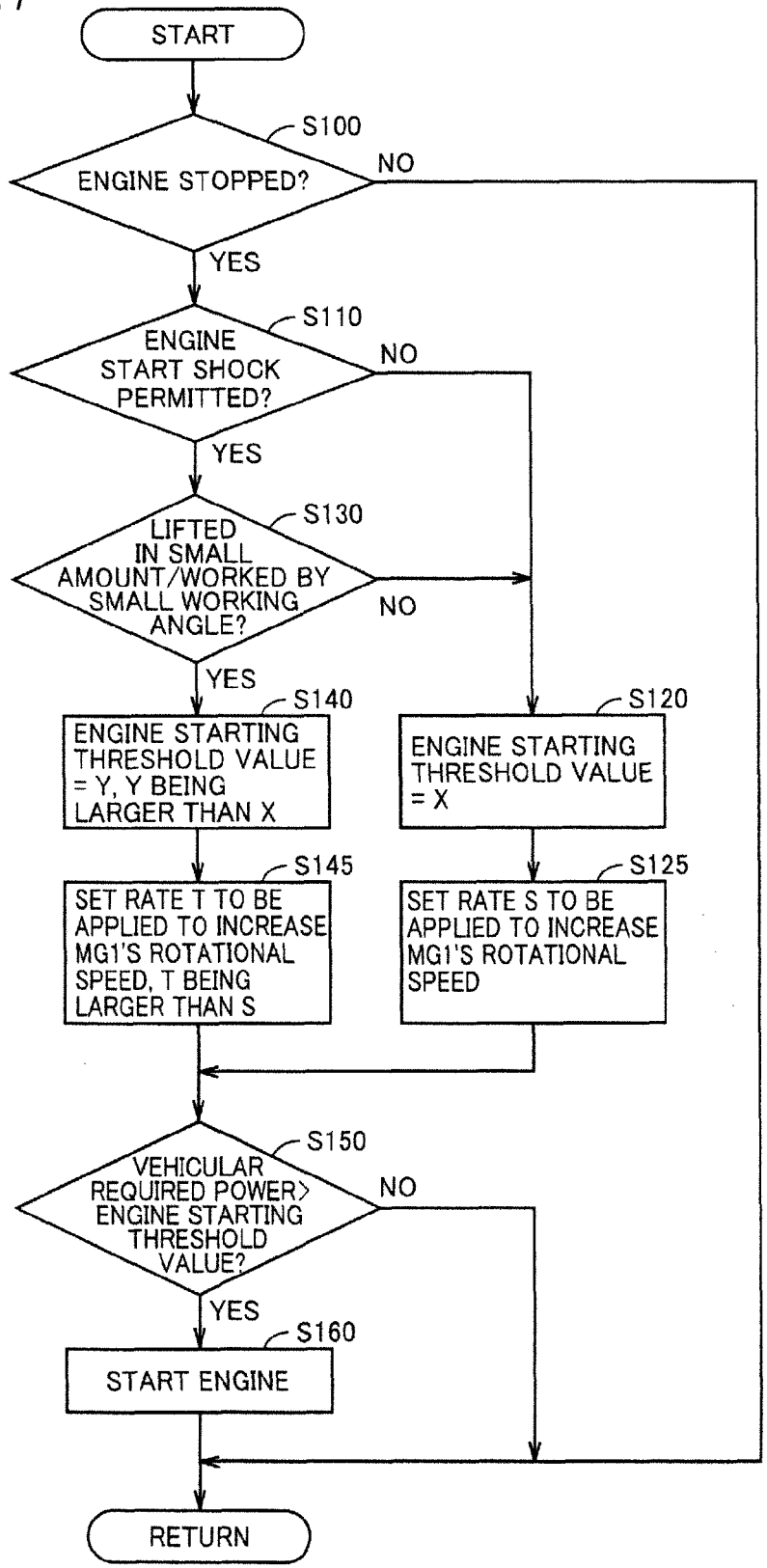
FIG. 17 is a flowchart for illustrating a process that a control device of the present invention in a second embodiment follows to perform a start control.

FIG. 17 is a flowchart for illustrating a process that a control device 200B of the present invention in the second embodiment follows to perform a start control. Note that the remainder in configuration of control device 200B according to the second embodiment is similar to that according to the first embodiment.

With reference to FIG. 17, S100-S120, S130-S140, and S150-S160 are similar to the first embodiment, and accordingly, will not be described repeatedly. In S120, the engine starting threshold value is set to prescribed value X, and in response, control device 200B sets to a prescribed value S a rate applied to increase motor generator MG1's rotational speed (S125).

In S140, the engine starting threshold value is set to prescribed value Y, and in response, control device 200B sets to a prescribed value T larger than prescribed value S a rate applied to increase motor generator MG1's rotational speed (S145). Note that prescribed values S and T are values set depending on a rate applied in starting engine 100 to increase motor generator MG1's rotational speed. More specifically, engine 100 has an output shaft coupled with a shaft of rotation of motor generator MG1, and accordingly, prescribed values S and T are set to avoid preventing the engine's rotational speed from increasing.

When intake valve 118 is lifted in a small amount and worked by a small working angle, high engine torque response is provided and the engine's rotational speed rapidly increases, and accordingly, prescribed value T is set to be a value larger than prescribed value S. Control device 200B in starting engine 100 controls motor generator MG1 according to a rate, as set, applied to increase motor generator MG1's rotational speed.

Thus, in the second embodiment, in starting engine 100 when intake valve 118 is lifted in a small amount and/or worked by a small working angle control device 200B controls motor generator MG1 to increase a rate that is applied to increase motor generator MG1's rotational speed to be a rate higher than when intake valve 118 is lifted in a large amount and/or worked by a large working angle. Increasing the rate applied to increase motor generator MG1's rotational speed can reduce/prevent preventing engine 100's rotational speed from increasing.

Third Embodiment

A third embodiment will be described for varying an amount of lifting intake valve 118 and a working angle on intake valve 118 after starting engine 100 is started.

Figure 18:
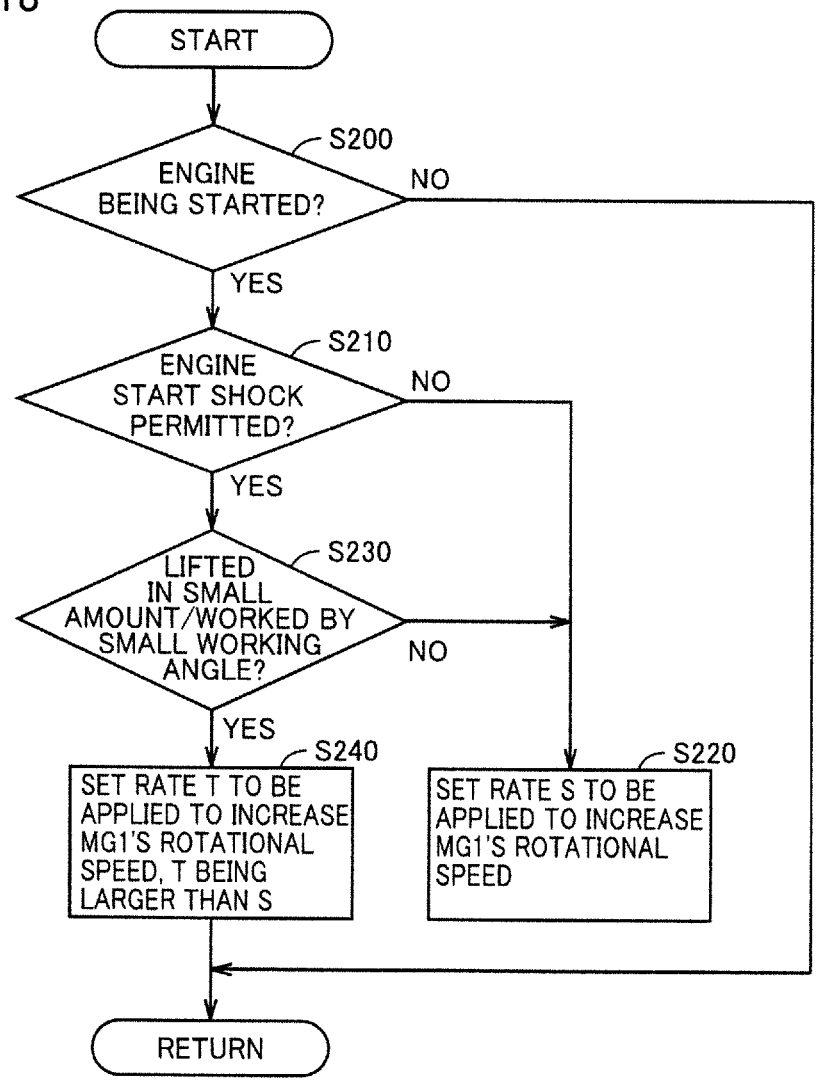
FIG. 18 is a flowchart for illustrating a process that a control device of the present invention in a third embodiment follows to perform a start control.

FIG. 18 is a flowchart for illustrating a process that a control device 200C of the present invention in the third embodiment follows to perform a start control. Note that the remainder in configuration of control device 200C according to the third embodiment is similar to that according to the first embodiment.

With reference to FIG. 18, control device 200C in S200 determines whether the engine is currently being started. Note that the engine being currently being started means a period of time after cranking engine 100 is started before engine 100 is operated at a desired operating point, under an engine start control.

If it is determined that the engine is currently not being started (NO in S200), the subsequent steps are not performed the control returns to the main routine. If it is determined that the engine is currently being started (YES in S200), control device 200C determines whether the engine start shock is permitted (S210).

If it is determined that the engine start shock is not permitted (NO in S210), control device 200C sets to prescribed value S a rate applied to increase motor generator MG1's rotational speed (S220). If it is determined that the engine start shock is permitted (YES in S210), control device 200C determines whether intake valve 118 is lifted in a small amount and worked by a small working angle (S230).

If it is determined that intake valve 118 is lifted in a large amount and worked by a large working angle (NO in S230), control device 200C sets to prescribed value S the rate applied to increase motor generator MG1's rotational speed (S220). If it is determined that intake valve 118 is lifted in a small amount and worked by a small working angle (YES in S230), control device 200C sets to prescribed value T larger than prescribed value S the rate applied to increase motor generator MG1's rotational speed (S240).

Control device 200C in starting engine 100 controls motor generator MG1 according to a rate, as set, applied to increase motor generator MG1's rotational speed.

Figure 19:
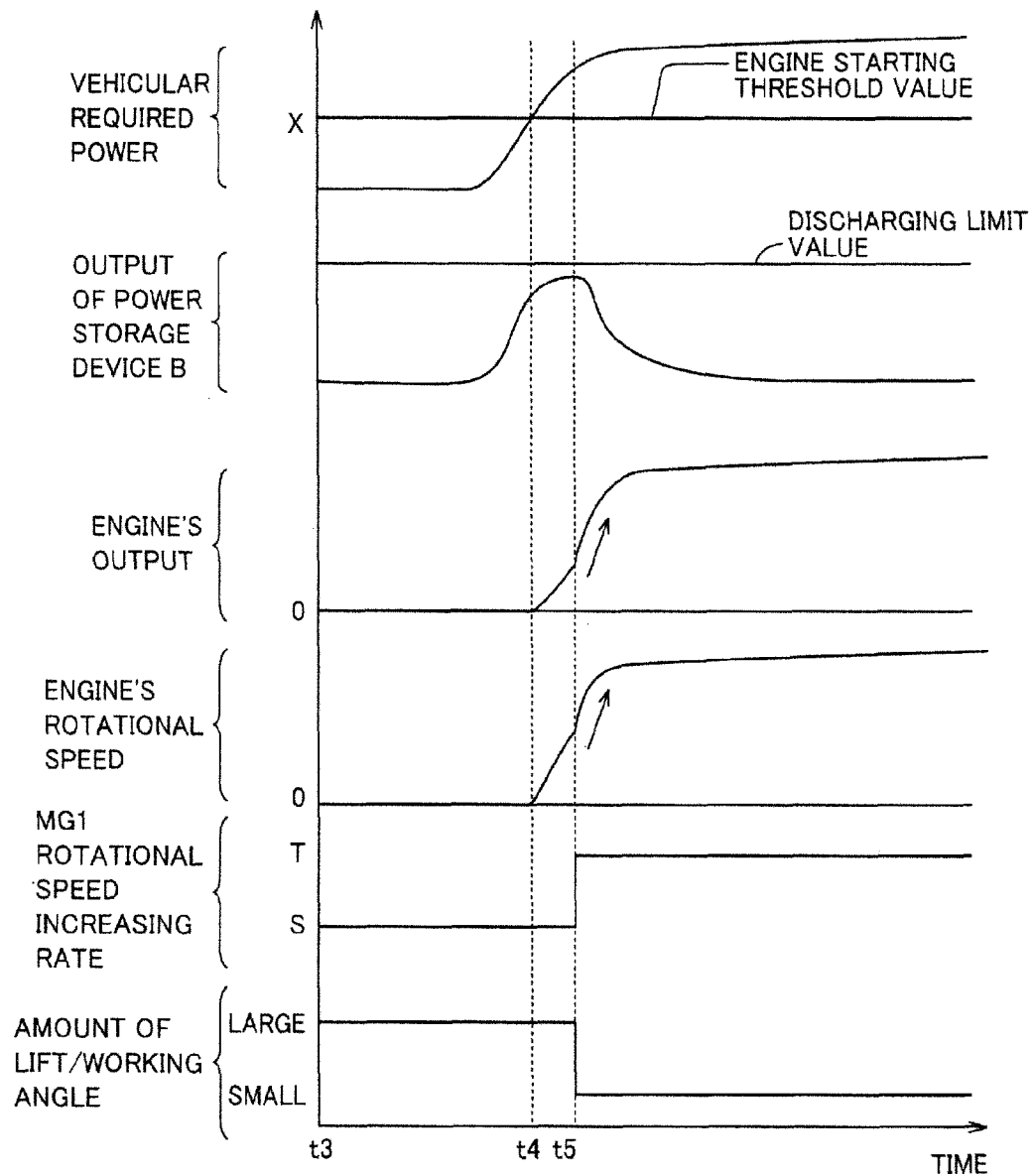
FIG. 19 is timing plots for illustrating how the control device of the present invention in the third embodiment performs the start control.

FIG. 19 is timing plots for illustrating how control device 200C of the present invention in the third embodiment performs a start control. In FIG. 19, the axis of abscissa represents time and the axis of ordinate represents vehicular required power, the output of power storage device B, the engine's output, the engine's rotational speed, the rate applied to increase motor generator MG1's rotational speed, and the amount of lifting intake valve 118 and the working angle on intake valve 118.

With reference to FIG. 19, at time t3 engine 100 is stopped and a large amount of lifting intake valve 118 and a large working angle on intake valve 118 are applied for the sake of illustration. At time t4, vehicular required power exceeds the engine starting threshold value (of prescribed value X), and accordingly, starting engine 100 starts. As starting engine 100 is started with intake valve 118 lifted in the large amount and worked by the large working angle, the engine's output and rotational speed gradually increase.

At time t5, when the amount of lifting intake valve 118 and the working angle on intake valve 118 are varied to be small, enhanced engine torque response is provided, and accordingly, a rate applied to increase motor generator MG1's rotational speed is set to be high. This steeply increases the engine's output and rotational speed.

Thus, in the third embodiment, in starting engine 100 when at least one of the amount of lifting intake valve 118 and the working angle on intake valve 118 is varied to be small control device 200C controls motor generator MG1 to increase a rate that is applied to increase motor generator MG1's rotational speed to be a rate higher than that applied when intake valve 118 is lifted in a large amount and/or worked by a large working angle. Starting engine 100 with at least one of the amount of lifting the intake valve and the working angle on the intake valve varied to be small, and accordingly, increasing a rate applied to increase motor generator MG1's rotational speed, can reduce/prevent preventing engine 100's rotational speed from increasing.

While the above embodiments have been described for a case with the amount of lifting intake valve 118 and the working angle on intake valve 118 both varied, the present invention is also applicable to a case with the amount of lifting intake valve 118 alone varied and a case with the working angle on intake valve 118 alone varied. A configuration that can vary either the amount of lifting intake valve 118 or the working angle on intake valve 118 can be as effective as that which can vary both the amount of lifting intake valve 118 and the working angle on intake valve 118. Note that the configuration that can vary either the amount of lifting intake valve 118 or the working angle on intake valve 118 can be implemented via well known technology.

While the above embodiments have been described in connection with a series/parallel type hybrid vehicle capable of splitting the motive power of engine 100 by power split device 4 and thus transmitting the split motive power to driving wheel 6 and motor generators MG1 and MG2, the present invention is also applicable to hybrid vehicles of other types. More specifically, the present invention is for example also applicable to a so-called series type hybrid vehicle that uses engine 100 only to drive motor generator MG1 and generates vehicular driving force only by motor generator MG2, a hybrid vehicle recovering only regenerated energy of kinetic energy that is generated by engine 100 as electrical energy, a motor-assisted hybrid vehicle using an engine as a main driving force source and assisted by a motor as required, and the like. Furthermore, the present invention is also applicable to a hybrid vehicle which allows a motor to be disconnected and travels by the driving force of the engine alone.

Note that, in the above, engine 100 corresponds in the present invention to one embodiment of an internal combustion engine and motor generator MG2 corresponds in the present invention to one embodiment of a first rotating electric machine. Furthermore, motor generator MG1 corresponds in the present invention to one embodiment of a second rotating electric machine and VVL device 400 corresponds in the present invention to one embodiment of a variable valve actuation device. Furthermore, in the present invention, "when a first state is selected" indicates intake valve 118 being lifted in a small amount and/or worked by a small working angle, and "when a second state is selected" indicates intake valve 118 being lifted in a large amount and/or worked by a large working angle.

While the present invention has thus been described in embodiments, the embodiments may be combined in configuration, as appropriate.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
    an internal combustion engine having a variable valve actuation device for varying an actuation characteristic of an intake valve;
    a chargeable power storage device;
    a first rotating electric machine receiving electric power supplied from said power storage device to generate driving force to cause the hybrid vehicle to travel; and
    a control device operative in response to a vehicular required power that the vehicle is required to output being smaller than a threshold value for stopping said internal combustion engine and allowing a driving force of said first rotating electric machine to be used to cause the vehicle to travel, and operative in response to said vehicular required power exceeding said threshold value for starting said internal combustion engine and allowing a driving force of said internal combustion engine and the driving force of said first rotating electric machine to be both used to cause the vehicle to travel,
    said variable valve actuation device being configured to select a first state and a second state, in the second state at least one of an amount of lifting said intake valve and a working angle on said intake valve is larger than in said first state,
    said control device performing a process to increase said threshold value to be higher when said first state is selected than when said second state is selected.

2. The hybrid vehicle according to claim 1, further comprising a second rotating electric machine coupled with an output shaft of said internal combustion engine and usable to start said internal combustion engine, wherein in starting said internal combustion engine when said first state is selected said control device controls said second rotating electric machine, while cranking said internal combustion engine, to increase a rate that is applied to increase a rotational speed of said second rotating electric machine to be a rate higher than that applied when said second state is selected.

3. The hybrid vehicle according to claim 2, wherein when said variable valve actuation device is switched from said second state to said first state during a start control of said internal combustion engine, said control device controls said second rotating electric machine, while cranking said internal combustion engine, to increase said rate that is applied to increase the rotational speed of said second rotating electric machine to be a rate higher than that applied when said second state is selected.

4. The hybrid vehicle according to claim 1, wherein said control device performs said process when said internal combustion engine's start shock is permitted.

5. The hybrid vehicle according to claim 2, wherein said control device performs said process when said internal combustion engine's start shock is permitted.

6. The hybrid vehicle according to claim 3, wherein said control device performs said process when said internal combustion engine's start shock is permitted.

7. The hybrid vehicle according to claim 1, wherein said variable valve actuation device is configured to switch said actuation characteristic of said intake valve to any one of a first characteristic and a second characteristic allowing at least one of said amount of lifting said intake valve and said working angle on said intake valve to be larger than when said actuation characteristic is said first characteristic, and a third characteristic allowing at least one of said amount of lifting said intake valve and said working angle on said intake valve to be larger than when said actuation characteristic is said second characteristic.

8. The hybrid vehicle according to claim 1, wherein said variable valve actuation device is configured to switch said actuation characteristic of said intake valve to any one of a first characteristic and a second characteristic allowing at least one of said amount of lifting said intake valve and said working angle on said intake valve to be larger than when said actuation characteristic is said first characteristic.

* * * * *

UNITED STATES PATENT AND TRADEMARK OFFICE
CERTIFICATE OF CORRECTION

PATENT NO. : 9,527,501 B2
APPLICATION NO. : 14/528239
DATED : December 27, 2016
INVENTOR(S) : Yoshikazu Asami et al.

It is certified that error appears in the above-identified patent and that said Letters Patent is hereby corrected as shown below:

On the Title Page

Item (73), Assignee information, delete "Toyoda" and insert --Toyota--, therefor.

In the Specification

In Column 7, Line 61, after "axially" delete "slideable." and insert --slidable.--, therefor.

In Column 7, Line 61, after "provided" delete "slideably" and insert --slidably--, therefor.

Signed and Sealed this
Fourteenth Day of March, 2017

Michelle K. Lee
*Director of the United States Patent and Trademark Office*